C. C. LEVY.
POULTRY DRINKING FOUNTAIN.
APPLICATION FILED SEPT. 9, 1911.

1,008,834.

Patented Nov. 14, 1911.

Witnesses
Edwin L. Bradford.
G. Ferd. Vogt.

Inventor
Charles C. Levy.
By Mann & Co.
Attorneys

UNITED STATES PATENT OFFICE.

CHARLES C. LEVY, OF BALTIMORE, MARYLAND, ASSIGNOR OF ONE-HALF TO JOHN WILSON BROWN, OF BALTIMORE, MARYLAND.

POULTRY DRINKING-FOUNTAIN.

1,008,834.      Specification of Letters Patent.      Patented Nov. 14, 1911.

Application filed September 9, 1911. Serial No. 648,490.

*To all whom it may concern:*

Be it known that I, CHARLES C. LEVY, a citizen of the United States, residing at Baltimore, in the State of Maryland, have invented certain new and useful Improvements in Poultry Drinking-Fountains, of which the following is a specification.

This invention relates to a drinking fountain for poultry confined in coops.

Chickens and other fowls are transported in coops from the country where they are raised to distant large cities to be sold; sometimes the distance is so great that the live fowls are kept in transit from one to three days during which time they not only suffer but a large proportion of them die for the want of water.

One object of this invention is to provide a fountain to contain drinking water and constructed especially for chickens and similar fowls, and adapted to be placed within a coop and fastened in position.

Another object is to provide a water-holding structure to supply the water to fowls confined in a coop,—the said structure to be both cheap and strong and to have provision that will allow the fowls to have ready access to the water while preventing filth from entering into the holder.

Figure 1:
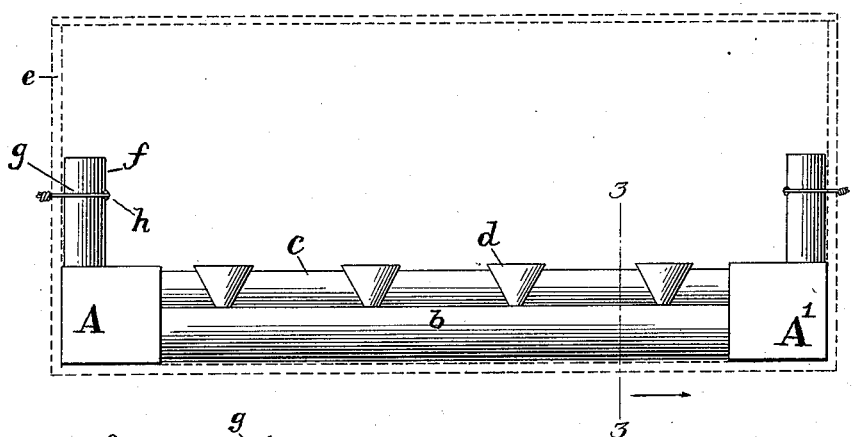
Figure 2:
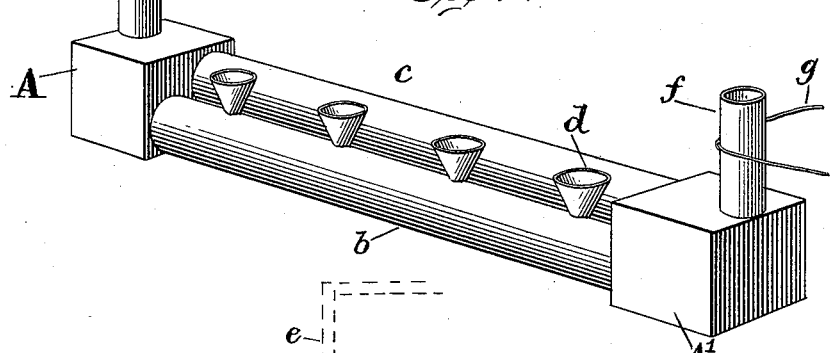
Figure 3:
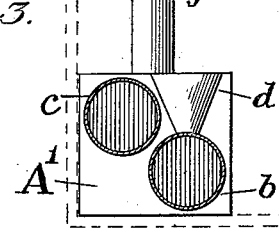

The invention is illustrated in the accompanying drawing in which,

Figure 1 is a front elevation of the water-holding receptacle for fowls. Fig. 2 is a perspective view of the same. Fig. 3 is a vertical cross-section on the line 3—3 of Fig. 1.

The water receptacle comprises two heads, A, $A^1$, connected together by two horizontal parallel pipes, $b$, $c$, one of which pipes is provided with drinking funnels, $d$, and is the lower; the side having these funnels I term the front. The other pipe, $c$, is higher than the front pipe and has position in a vertical plane back of the said front lower pipe. The ends of both horizontal pipes, $b$, $c$, are open into the said two heads. The top rim of each funnel, $d$, is as high as the higher back pipe, $c$, and said funnels have position close to the higher pipe. By this particular construction of water-holder the broad flat bottoms of the two heads, A, $A^1$, serve as feet to rest on the floor of a coop, and thereby maintain the water-holder in an upright position; connecting the two heads by the two parallel pipes, $b$, $c$, gives greater strength to the structure than would one pipe between the heads; as both pipes have their ends opened into the heads, the pipes constitute part of the space for storage of water. The higher of the two pipes has no exterior opening; all the drinking funnels, $d$, open into the lower pipe, $b$, and therefrom project upward so that the top rims of the said funnels are substantially on a level with the upper surface of the higher pipe. As the higher pipe, $c$, extends along and back of all the funnels, $d$, the water in said higher pipe serves to keep the funnels full; and this position of the pipe, $c$, keeps the chickens from getting between the end-wall, $e$, of the coop and the lower pipe, $b$, that has the funnels. The opening at the small end of each funnel, $d$, should be large enough to permit the bill of the chicken or other fowl to enter into pipe, $b$. Each head, A, $A^1$, of the drinking fountain is provided with an upward-projecting short rigid pipe, $f$, well secured to said head; these pipes have their upper end open and the water to fill the fountain may be poured in through either of these pipes. This drinking fountain should be fastened in the coop to prevent the fowls from moving it or upsetting it, and to effect this conveniently, flexible copper wires, $g$, are permanently secured by solder, $h$, to each upward-projecting pipe, $f$, and these wires may be brought through the wall of the coop and on the outside form a clip by twisting the two wire ends around a corner post or other part of the coop.

Coops designed for the shipment of poultry, such as chickens, and provided with one of these improved drinking fountains will keep the water in good condition with the result of preventing suffering and death on the part of the fowls.

Having thus described my invention what I claim and desire to secure by Letters Patent is,—

A drinking fountain for poultry confined in coops, consisting of two chambered heads at least one of which is provided with an upward-projecting pipe, and said two heads connected together by two horizontal parallel pipes one higher than the other and in a vertical plane back of the other—the higher one being imperforate between the said two heads, and drinking funnels opening into the said lower pipe and projecting upward immediately in front of the higher pipe with their top rims on a level with the upper surface of said higher pipe.

In testimony whereof I affix my signature in presence of two witnesses.

CHARLES C. LEVY.

Witnesses:
  G. FERD. VOGT,
  CHAS. B. MANN.